United States Patent
Balachandran et al.

(10) Patent No.: US 10,599,626 B2
(45) Date of Patent: Mar. 24, 2020

(54) ORGANIZATION FOR EFFICIENT DATA ANALYTICS

(71) Applicant: International Business Machines Corporation, Armonk, NY (US)

(72) Inventors: Subashini Balachandran, Sunnyvale, CA (US); Wayne A. Sawdon, San Jose, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 15/333,305

(22) Filed: Oct. 25, 2016

(65) Prior Publication Data

US 2018/0113936 A1    Apr. 26, 2018

(51) Int. Cl.
*G06F 16/22*    (2019.01)

(52) U.S. Cl.
CPC .................................. *G06F 16/221* (2019.01)

(58) Field of Classification Search
None
See application file for complete search history.

(56) References Cited

U.S. PATENT DOCUMENTS

| | | | |
|---|---|---|---|
| 6,134,559 A * | 10/2000 | Brumme | G06F 8/437 |
| 7,552,115 B2 | 6/2009 | Kalach et al. | |
| 8,510,331 B1 * | 8/2013 | Zoellner | G06F 17/30082 |
| | | | 707/770 |
| 8,589,550 B1 | 11/2013 | Faibish et al. | |
| 8,868,494 B2 | 10/2014 | Agrawal | |
| 2004/0186809 A1 * | 9/2004 | Schlesinger | G06F 21/6218 |
| | | | 705/50 |
| 2008/0270462 A1 * | 10/2008 | Thomsen | G06F 16/355 |
| 2009/0055345 A1 * | 2/2009 | Mehta | G06F 16/907 |
| 2009/0182610 A1 * | 7/2009 | Palanisamy | G06Q 10/06 |
| | | | 707/600 |
| 2012/0173522 A1 * | 7/2012 | Girsig | G06Q 10/10 |
| | | | 707/736 |
| 2012/0324069 A1 | 12/2012 | Nori et al. | |
| 2013/0054286 A1 * | 2/2013 | Oberhofer | G06Q 10/00 |
| | | | 705/7.11 |
| 2013/0110790 A1 | 5/2013 | Matsumoto et al. | |
| 2013/0290255 A1 | 10/2013 | Lin et al. | |
| 2014/0067884 A1 | 5/2014 | Tata | |
| 2015/0286495 A1 | 10/2015 | Lee | |
| 2016/0140207 A1 * | 5/2016 | Koeten | G06F 17/30082 |
| | | | 707/737 |

* cited by examiner

*Primary Examiner* — Christopher J Raab
(74) *Attorney, Agent, or Firm* — Lieberman & Brandsdorfer, LLC

(57) ABSTRACT

Embodiments relate to enabling sequential access for data scans on files with metadata. More specifically, object files are stored in a data storage. The objects are classified. A metaobject file is created in the data storage. The metaobject file is created by extracting attributes from the file from objects in a first classification. An entry is created in the metaobject file and the extracted attributes are stored in that entry. A file attribute is extracted from a file in the second classification and associated with the created entry in the metaobject file. A link is created between the file in the second classification and the related entry in the metaobject file.

20 Claims, 17 Drawing Sheets

ORGANIZATION FOR EFFICIENT DATA ANALYTICS

BACKGROUND

The present embodiments relate to metadata in storage systems and networks. More specifically, the embodiments relate to management of metadata by enabling sequential access for data scans on files with metadata.

An increased reliance on data objects has led to a need for detailed information related to the data objects, known as metadata, as well as techniques for managing and controlling the metadata. For instance, there is a high demand for images, videos, and audio. Accordingly, there is a high demand for metadata about the images, videos and audio.

To date, metadata has been applied in limited contexts, e.g. to allow manually annotation of image data shared via a social network. The limitations give rise to a technical gap between these conventional user-mediated metadata applications and the restrictive, regimented constraints imposed by data storage, management, and/or processing environments common to high throughput data processing centers, high volume data storage solutions, and related systems that operate using large volumes of data, high-volume data processing operations, an/or related data storage and retrieval solutions.

Access to metadata provides users with large quantities of information. However, accessing the metadata leads to massive scans of data that require large resources and time to process the request. Traditional file systems operate by storing metadata files independently on disk without any common write-placement patterns. Therefore, when accessing the metadata, files are treated as random access in the underlying file system thereby leading to sub-optimal scan performance.

Enterprises and organizations are creating, analyzing and keeping more data than ever before. Those that can deliver insights faster while managing rapid infrastructure growth are the leaders in their industry. To deliver those insights, an organization's underlying storage must support both new-era big data and traditional applications with security, reliability and high-performance. To handle massive unstructured data growth, the solution must scale seamlessly while matching data value to the capabilities and costs of different storage tiers and types. Consequently, it remains desirable for a high-performance solution for managing data at scale with the distinctive ability to perform archive and analytics.

SUMMARY

A system, computer program product, and method are provided enabling efficient access of data object through a metaobject file.

In one aspect, a system is provided with a processing unit operatively coupled to a memory. A tool is in communication with the processing unit in order to facilitate storage of object files. As object files are received in data storage, the tool classifies the objects based on object characteristics. The classifications may be a first classification and a second classification. A metaobject file is created in the storage. For each object in the first classification, the tool extracts attributes from the file, including an object identifier, creates an entry in the metaobject file, and stores the extracted attributes in the created entry in the metaobject file. Similarly, for each object in the second classification, the tool retains the object as a file in the data storage, extracts an attribute from the object, and associates the extracted attributed with the created entry in the metaobject file. A link is established between the file and the related entry in the metaobject file. The metaobject file facilitates read requests for any file referenced in the metaobject file, including translation of the read request to a read of the metaobject file.

In another aspect, a computer program product is provided to enable storage and analytics of metadata. The computer program product includes a computer readable storage device with embodied code that is configured to be executed by a processor. More specifically, computer program code is embodied to store two or more object files in data storage, including program code to classify the objects based on object characteristics. The classifications may be a first classification and a second classification. The program code creates a metaobject file in the storage. More specifically, for each object in the first classification, the program code extracts attributes from the file, including an object identifier, creates an entry in the metaobject file, and stores the extracted attributes in the created entry in the metaobject file. Additionally, for each object in the second classification, the program code retains the object as a file in the data storage, extracts an attribute from the object, and associates the extracted attributed with the created entry in the metaobject file. More specifically, the program code creates a link between the file and the related entry in the metaobject file. Responsive to receipt of a read request, the program code translates the received request to a read of the metaobject file.

In yet another aspect, a method is provided to enable storage and analytics of metadata. Two or more object files are stored in data storage, and the object files are classified based on object characteristics. The classifications may be a first classification and a second classification. A metaobject file is created in the storage. For each object that is a member in the first classification, an attribute is extracted from the file, including an object identifier, an entry is created in the metaobject file, and the extracted attributes are stored in the created entry in the metaobject file. Similarly, for each object in the second classification, the object is retained as a file in the data storage, an attribute is extracted from the object and the extracted attribute is associated with the created entry in the metaobject file. In addition, a link is created between the file and related entry in the metaobject file. As a read request is received, the request is translated to a read of the metaobject file.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A system and method to efficiently store, organize and analyze metadata are provided, with embodiments discussed below in detail. As shown and described, metadata associated with data objects and data files, hereinafter referred to as data, may be stored in a metaobject file. The individual data object files are customizable and may contain a variety of different attributes, which are captured and reflected in the metaobject file.

Figure 1:
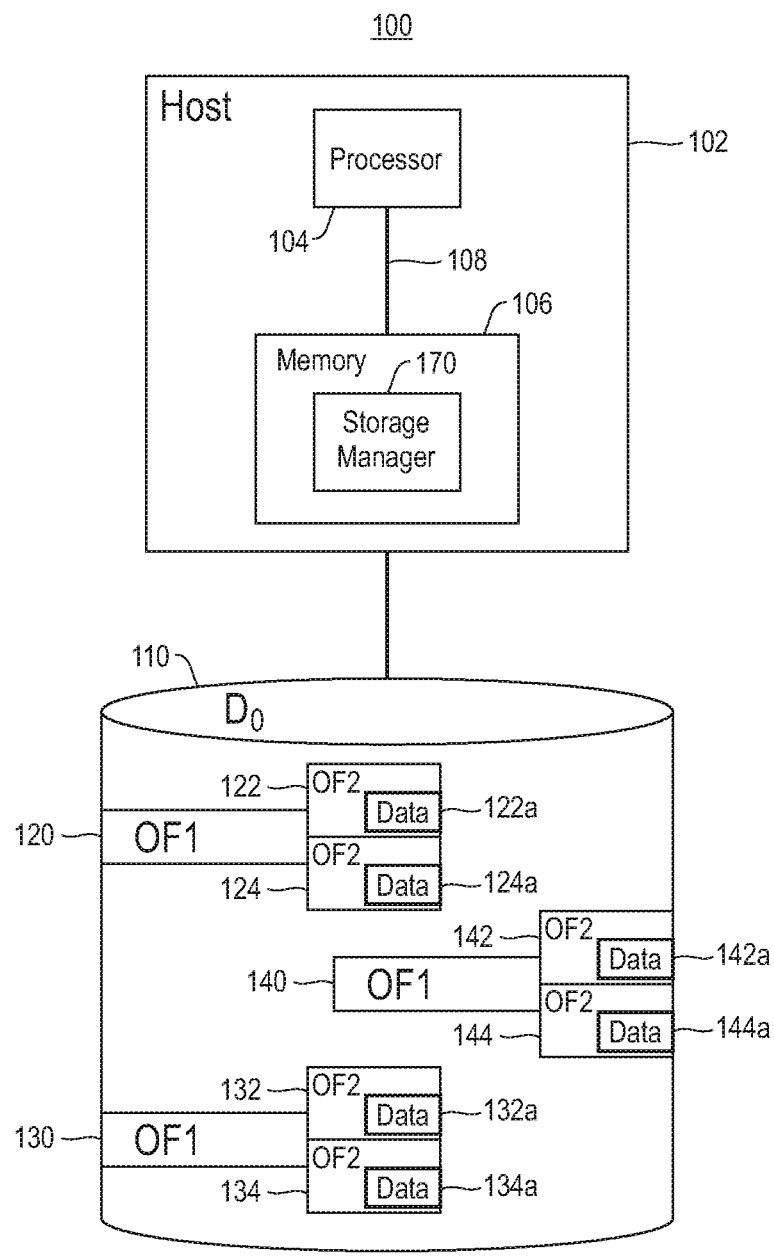
FIG. 1 depicts a block diagram for illustrating an embodiment of a data management system having object files stored generally.

Referring to FIG. 1, a block diagram is provided to illustrate an embodiment of a data management system (100) having data stored generally. As shown, the data management system (100) comprises a host (102) in communication with data storage, $D_O$, (110), which in one embodiment is a persistent storage device. Host (102) is shown with a processing unit (104) in communication with a memory (106) across a bus (108). A storage manager (170) is shown local to the host (102) and functions to support a plurality of functions. In the example shown, the storage manager (170) is local to memory (106) and is configured operatively coupled to the processor (104). The data storage, $D_O$, (110) is configured to store object files. In the example shown, the object files are placed into classes, e.g. classified, based on the file characteristics, and in one embodiment, the underlying data. Accordingly, two or more classes of data may be stored on a persistent storage, and/or organized and maintained in an internal data structure.

As shown herein there are two classes of object files, including a first class, e.g. $class_1$, of object files (120), (130), (140) and a second class, e.g. $class_2$, object files (122), (124), (132), (134), (142), and (144). In one embodiment, the object files are classified based on the type of data stored in the object file. Similarly, in another embodiment, the object files are classified based on the size of the data stored in the object file. Each $class_2$ object file is shown herein to contain data. More specifically, $class_2$ object file (122) is shown to contain data (122a), $class_2$ object file (124) is shown to contain data (124a), $class_2$ object file (132) is shown to contain data (132a), $class_2$ object file (134) is shown to contain data (134a), $class_2$ object file (142) is shown to contain data (142a), and $class_2$ object file (144) is shown to contain data (144a). Similarly, in another embodiment, the $class_1$ object files contain data. In one embodiment, each $class_1$ object file is associated with one or more $class_2$ object files. As shown in this example, $class_1$ object file (120) is associated with $class_2$ object files (122) and (124), $class_1$ object file (130) is associated with $class_2$ object files (132) and (134), and $class_1$ object file (140) is associated with $class_2$ object files (142) and (144). In one embodiment, one or more $class_2$ object files may be associated with multiple $class_1$ object files. Accordingly, object files may be classified based on a variety of parameters.

As shown in FIG. 1, there are different classes of object files, and in one embodiment, there may be a relationship between the object files. It is understood that each object file contains or is associated with underlying data. At the same time, the object files may come in different forms to support different data formats. For example, in one embodiment, $class_1$ object files may include, but are not limited to, data in the form of executables, pdfs, presentations, audio, video, image, MRIs, and X-Rays. In one embodiment, the $class_2$ object files may contain or store attributes, including, but not limited to, derived attributes and data attributes based on file content. For example, in a health care field attributes of the $class_2$ object file may include, but are not limited to, patient data including name, age, height, weight, blood pressure, temperature, and object identifiers. Additionally, derived attributes of the $class_2$ object file may include, but are not limited to, statistics, summaries and manually entered labels. Similarly, in one embodiment, $class_2$ object files contain custom attributes. Accordingly, multiple classes of objects are shown and described, with each class configured to store data and object files.

The data retained in storage may be subject to analysis and processing. In one embodiment, a workload is generated to analyze the data contained in the data storage, $D_0$, (110). The workload may take the form of a read request, including but not limited to a query, such as average, sum, minimum, maximum, median, medium, or other data operation known to those skilled in the art. The query may operate on all the data or subset of the data contained in data storage, $D_0$, (110). In one embodiment, data may be stored on two or more storage devices, and the read request may employ multiple storage devices. Similarly, in one embodiment, the read request may operate as a random lookup of one or more $class_1$ and/or $class_2$ object files.

Figure 2:
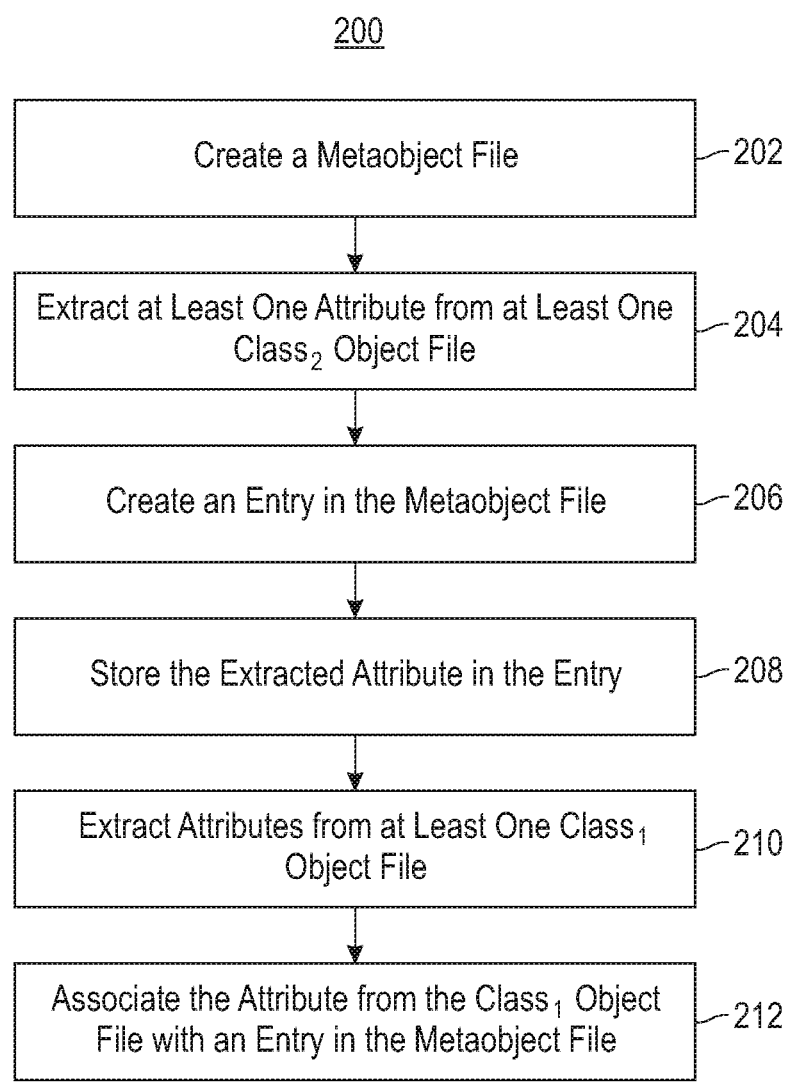
FIG. 2 depicts a flow chart illustrating an embodiment of a process to create a metaobject file for optimized data storage.

Referring to FIG. 2, a flow chart (200) is provided illustrating a process to create a metaobject file for optimized data storage. Based on the system shown and described in FIG. 1, the storage manager (170) creates a metaobject file in the data storage, $D_0$, (202), which may be populated with data from multiple object file classes. More specifically, the storage manager (170) extracts at least one attribute, $A_{SO}$, from at least one $class_2$ object file (204), e.g. (122) (124), (132), (134), (142) or (144), contained in the data storage, $D_0$. In one embodiment, the attribute may be an object identifier. Similarly, in one embodiment, such as a medical file, the attribute may be one or more patient characteristics, such as name, age, height, weight, blood pressure, temperature, location, and time. An entry, $E_0$, is created in the metaobject file for the at least one attribute (206), $A_{SO}$. As shown, at least one attribute, $A_{SO}$, is stored in the entry, $E_0$, (208). In addition, at least one attribute, $A_{LO}$, is extracted from at least one $class_1$ object file (210), e.g. (120), (130), and (140), and associated with the entry, $E_0$, created in the metaobject file (212). In one embodiment, the $class_2$ object file is removed after the attributes are extracted and stored in the metaobject file thereby reducing the number of object files in data storage separate from the metaobject file. Accordingly, a metaobject file is associated with a $class_1$ object file, and in one embodiment stores one or more $class_2$ object files.

As shown and described, an association is established between a $class_1$ object file and at least one entry in the metaobject file. In one embodiment, the association is in the form of a link created between the $class_1$ object file and the corresponding entry, $E_0$ (212). The link may be used to support efficient access to the $class_1$ object or efficient access to the entry in the metaobject file corresponding to the $class_1$ object file. In one embodiment, a link is created between the $class_2$ object file and the corresponding entry, $E_0$. Thus, the link provides efficient access between an object file and a corresponding entry in the metaobject file.

As the entries in the metaobject file increase, the challenge of searching the entries increases. To resolve this issue, an index may be created for the metaobject file. The index may come in different forms depending on the organization and structure of the metaobject file. The index may refer to each entry in the metafile by an object identifier. In one embodiment, the index is organized by an object identifier and contains a link to an entry in the metaobject file corresponding to the object identifier. In one embodiment, the index may be organized by a $class_1$ object identifier. In one embodiment, the index entry includes an offset identifying a location for the associated entry(ies) in the metaobject file. In one embodiment, the offset is a row number for a metaobject having a row orientation, or a column number for a metaobject having a column orientation. The index functions to support efficiency of searching objects referenced or stored in the metaobject file.

Figure 3:
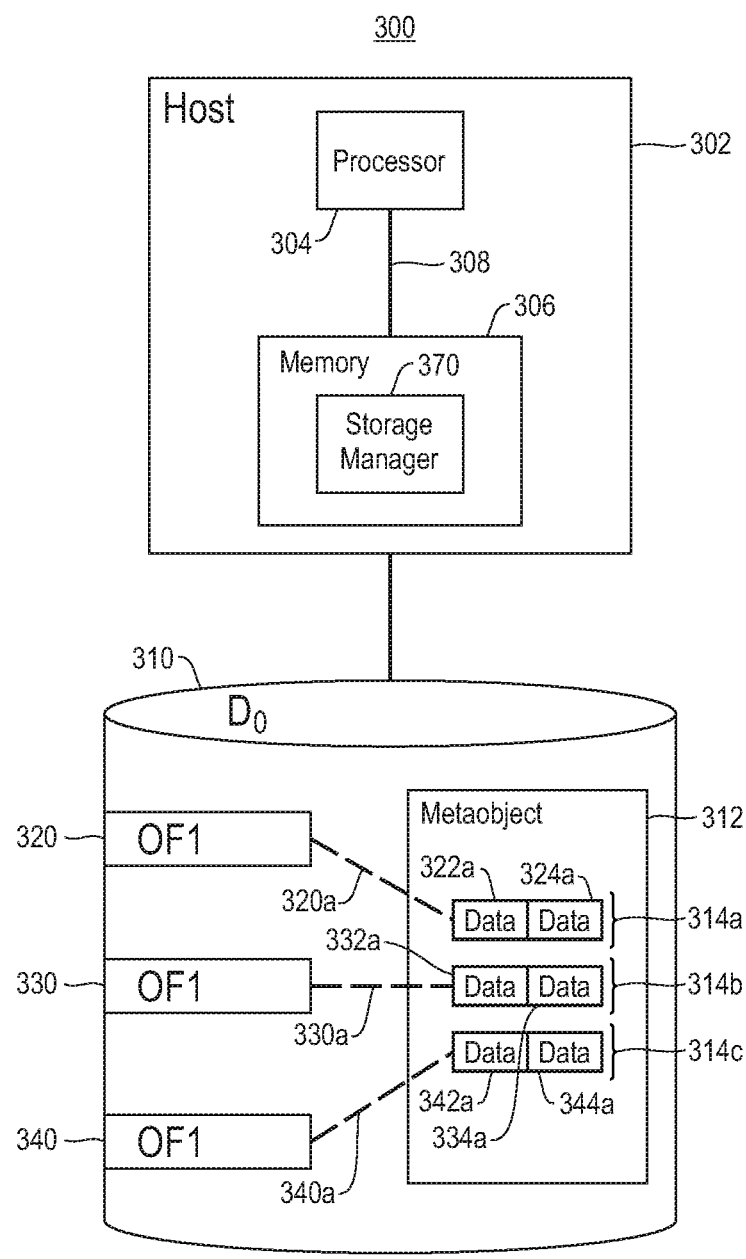
FIG. 3 depicts a block diagram illustrating an embodiment of the relationship between a metaobject file and data and the relationship between the metaobject file and a host.

Referring to FIG. 3, a data management system (300) is provided illustrating the relationship between the metaobject file and data and the relationship between the metaobject file and a host. As shown, the host (302) is configured with a processing unit (304) in communication with a memory (306) across a bus (308). The host (302) is shown in communication with data storage (310). A storage manager (370) is shown local to the host (302) and in one embodiment local to memory (306) and operatively coupled to the processing unit (304). The storage manager (370) functions to support a plurality of functions related to the objects in the data storage (310). As shown, the data storage (310) includes a plurality of $class_1$ object files, shown herein as (320), (330), and (340), and a metaobject file (312). The metaobject file (312) may be created by the process show and described in FIG. 2. As shown, the metaobject file (312) contains entries (314a), (314b) and (314c), with each entry including one or more attributes associated with data objects, e.g. $class_1$ and $class_2$ object. For example, entry (314a) is shown with attributes (322a) and (324a), entry (314b) is shown with attributes (332a) and (334a), and entry (314c) is shown with attributes (342a), and (344a). Although only two attributes are shown for each entry, this quantity should not be considered limiting. Accordingly, organization of entries in the metaobject file supports efficient searching of data.

The data attributes in the metaobject file associated with each entry are extracted from the data object files, e.g. $class_1$ and $class_2$ objects identified in the metaobject file. The entries (314a), (314b) and (314c) are associated with a corresponding $class_1$ object file. In one embodiment, $class_1$ object file (320) includes one or more attributes that are populated into entry (314a). The relationship between the $class_1$ object file (320) and the entry (314a) is shown herein with link (320a). Similarly, $class_1$ object file (330) includes one or more attributes that are populated into entry (314b), with the relationship between the $class_1$ object file (330) and the entry (314b) represented by link (330a), and $class_1$ object file (340) includes one or more attributes that are populated into entry (314c), with the relationship between the $class_1$ object file (340) and the entry (314c) represented by link (340a). Accordingly, an entry in the metaobject file may be populated with a variety of attributes.

The metaobject file (312) is dynamic in that entries may be added to the metaobject file as associated object files are added or created, and entries may be removed from the metaobject file as files and associated objects are moved or deleted. Similarly, an object file may be subject to modification, and the associated entry in the metaobject file (312) may be modified to reflect the object modification(s). The metaobject file (312) is shown herein stored local to the referenced objects. In one embodiment, the metaobject file (312) may be stored in a different storage location, e.g. remote from the $class_1$ object file linked to an entry in the metaobject file (312). Similarly, in one embodiment, the $class_1$ and $class_2$ object files referenced in the metaobject file (312) may be stored on different storage devices or systems. The metaobject file (312) may be local to one of the object file classes, or in one embodiment remote from both of the object file classes. Therefore, a metaobject file dynamically updates as associated object files are modified in any data storage location.

As described briefly above, the metaobject file (312) may support read and write request, with a read request returning data referenced in the metaobject file, and the write request either amending an existing entry in the metaobject file (312) or creating a new entry in the metaobject file (312). To facilitate read and write requests, an organization of the metaobject file (312), specifically the entries therein, is required. For example, a read request may contain one or more queries that operate on all the data or subset of the data contained in data storage, $D_0$, (310). Examples of such queries include, but are not limited to, average, sum, minimum, maximum, median, medium, or other data operation known to those skilled in the art. Receipt of the read request includes a translation to a read of the metaobject file. The translation is possible since the read request is be directed to the metaobject file where the data is stored instead of having to search for the $class_2$ object files contained in the data storage, which may be stored without a location pattern. In one embodiment, the read request includes a translation to a sequential read of the metaobject file where the data is stored sequentially. The sequential read limits random access of data and is performed quicker than a random access of the data. Therefore, a metaobject provides an organized data for efficient data analytics.

Figure 4:
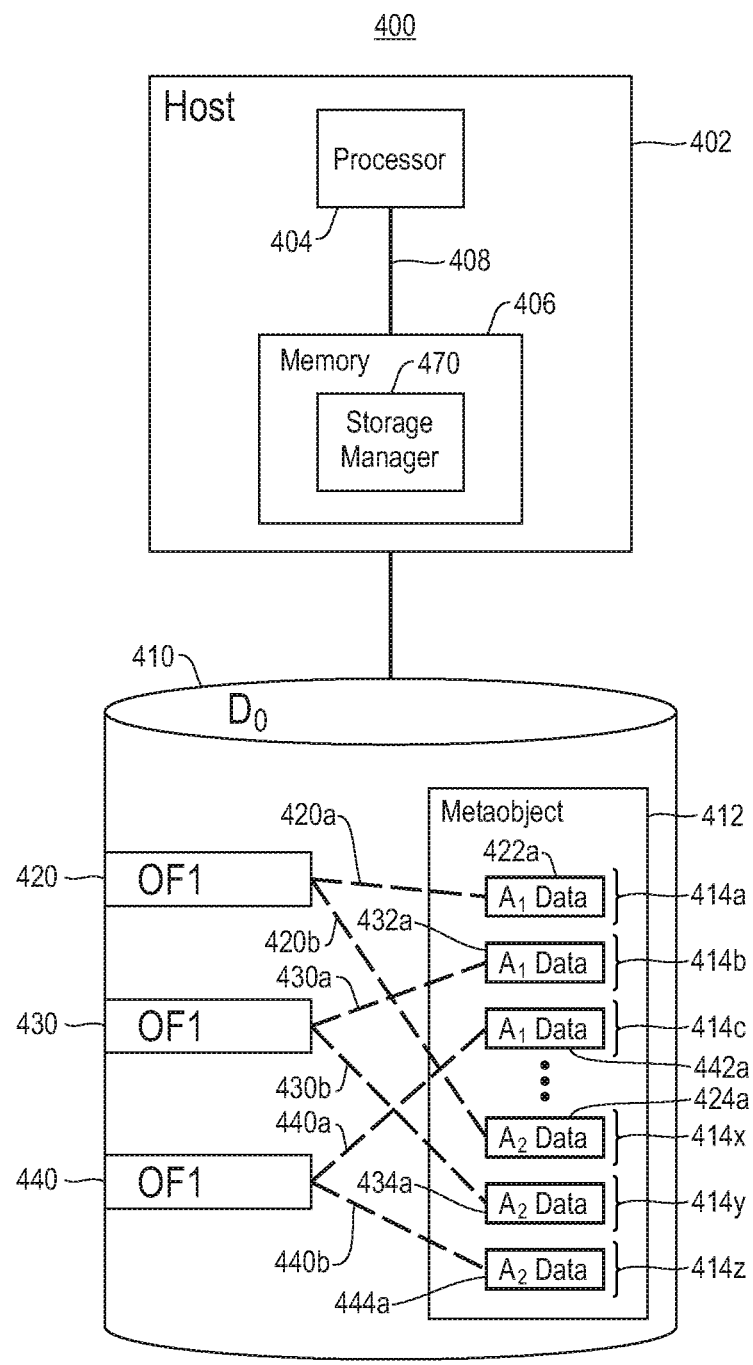
FIG. 4 depicts a block diagram illustrating an embodiment of a data management system having a metaobject file arranged in a column orientation.

Referring to FIG. 4, a block diagram is provided to illustrate an embodiment of a data management system (400) having a metaobject file arranged in a column orientation. As shown, data management system (400) comprises a host (402) in communication with data storage, $D_0$, (410). Host (402) is shown with a processing unit (404) in communication with a memory (406) across a bus (408). A storage manager (470) is shown local to the host (402) and functions to support a plurality of functions. As shown, data storage (410) includes a plurality of $class_1$ object files, shown herein as (420), (430), (440) and a metaobject file (412). The metaobject file (412) may be created by the process show and described in FIG. 2. The metaobject file (412) contains entries (414a), (414b), (414c), (414x), (414y) and (414z), with each entry including one or more attributes associated with data objects, e.g. $class_1$ and $class_2$ object files. For example, entry (414a) is shown with attribute (422a), entry (414b) is shown with attribute (432a), entry (414c) is shown with attribute (442a), entry (414x) is shown with attribute (424a), entry (414y) is shown with attribute (434a), and entry (414z) is shown with attribute (444a). Accordingly, each entry in the metaobject file is shown defining a relationship with an object file and at least one associated attribute.

The data attributes in the metaobject file associated with each entry are extracted from the data object files, e.g. $class_1$ and $class_2$ object files identified in the metaobject file. The entries (414a), (414b), (414c), (414x), (414y) and (414z) are associated with a corresponding $class_1$ object file. The relationship between $class_1$ object file (420) and the entry (414a) is shown by link (420a) and the relationship between $class_1$ object file (420) and entry (414x) is shown by link (420b). Similarly, the relationship between $class_1$ object file (430) and the entry (414b) is shown by link (430a) and the relationship between $class_1$ object file (430) and entry (414y) is shown by link (430b). Additionally, the relationship between and $class_1$ object file (440) and entry (414c) is shown by link (440a) and the relationship between $class_1$ object file (440) and entry (414z) is shown by link (440b). Accordingly, as shown herein, a $class_1$ object file is associated with data in the metaobject file.

The attributes (422a), (432a) and (442a) correspond to a first attribute type, ($A_1$). The data (424a), (434a) and (444a) correspond to a second attribute type, ($A_2$). As shown, the metaobject file is arranged in a column orientation wherein extracted attributes are sequentially stored as entries by attribute type in the metaobject file (e.g. attributes corresponding to $A_1$ are stored first, then attributes corresponding to $A_2$, . . . etc. and then attributes corresponding to attribute $A_N$). The quantity of entries, attributes, and $class_1$ objects as shown should not be considered limiting. In one embodiment, the column store orientation provides for better performance against queries or scans as compared to a row store orientation. Therefore, the metaobject file may have a row or column orientation, both configurations to support read and write requests.

Figure 5:
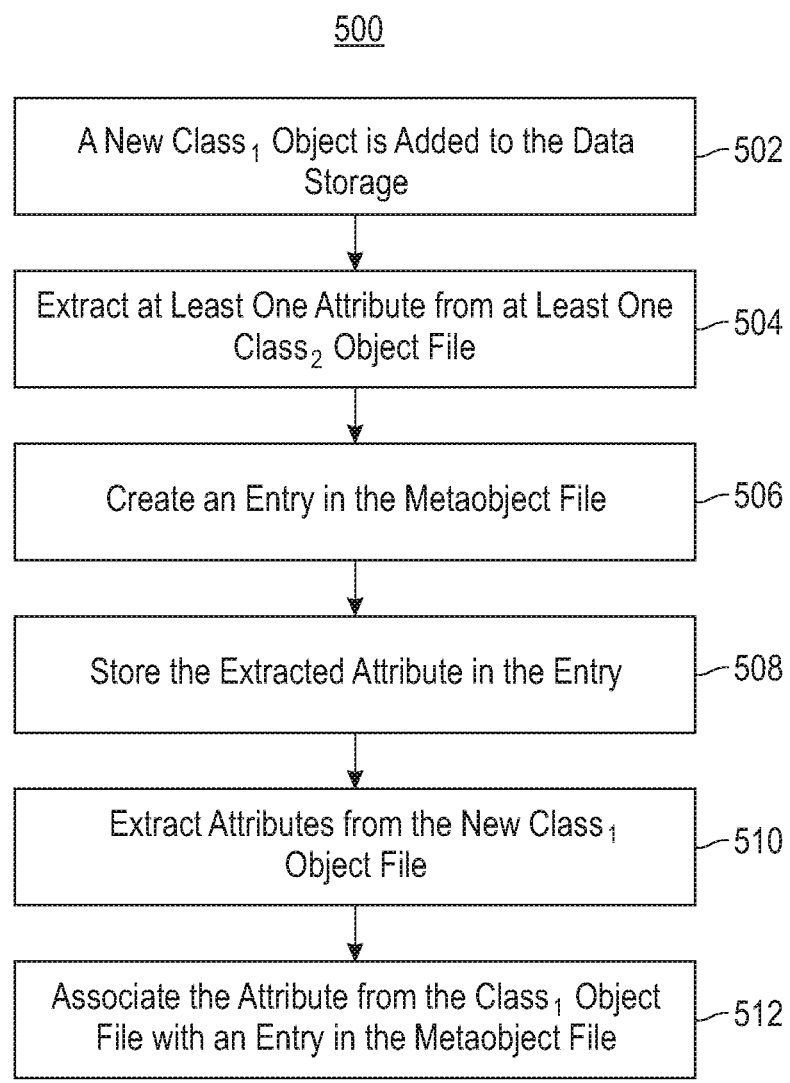
FIG. 5 depicts a flow chart illustrating a process to support a write request to the metaobject file.

Referring to FIG. 5, a flow chart (500) is provided illustrating a process to support a write request to the metaobject file. Based on the system shown and described in FIG. 3, a new $class_1$ object file is added to data storage, $D_0$ (502). The storage manager (370) extracts at least one attribute, $A_{SO}$, from at least one $class_2$ object file (504) associated with the new $class_1$ object file. In one embodiment, the attribute may be an object identifier. Similarly, in one embodiment, such as a medical file, the attribute may be one or more patient characteristics, such as name, age, height, weight, blood pressure, temperature, location, and time. An entry, $E_n$, is created in the metaobject file for the attribute (506), $A_{SO}$, and at least one attribute, $A_{SO}$, is stored in the entry, $E_n$, (508). In addition, at least one attribute, $A_{LO}$, is extracted from the new $class_1$ object file (510) and associated with the entry, $E_n$, created in the metaobject file (512). In one embodiment, the entry is added to the metaobject file through a log-file whereby there is minimal delay in creating the $class_1$ object. Accordingly, an entry can be added to the metaobject file.

Figure 6:
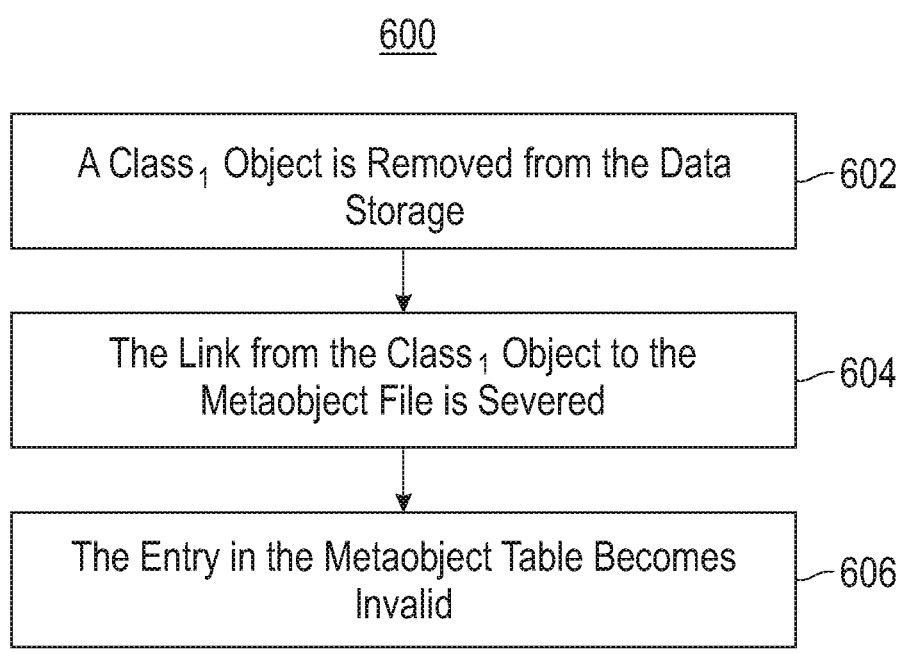
FIG. 6 depicts a flow chart illustrating a process to modify the metaobject file for optimized data storage by removing a link demonstrating an association between an entry in the metaobject file and data.

Referring to FIG. 6, a flow chart (600) is provided illustrating a process to modify a metaobject file for optimized data storage by removing a link demonstrating an association between an entry in the metaobject file and data. Based on the system shown and described in FIG. 3, a $class_1$ object file is removed from data storage, $D_0$ (602). When the $class_1$ object file is removed from data storage, $D_0$, at step (602) the corresponding link to the metaobject file entry is severed (e.g. the link count is decremented or made zero) (604). When the link is severed, the associated entry in the metaobject file for the removed object becomes invalid (606). In one embodiment, a gap is created in the metaobject file when an entry becomes invalid or is removed. Accordingly, the entry to a $class_1$ object in the metaobject file can become invalid by severing the link with the metaobject file.

Figure 7:
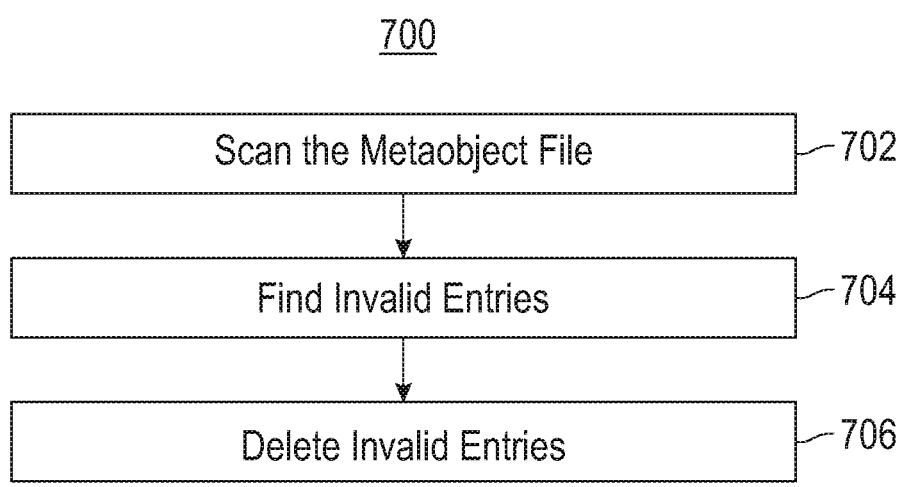
FIG. 7 depicts a flow chart illustrating a process to control modification of the metaobject file by removing one or more invalid entry(ies).

It is understood that the metaobject file is subject to change based on writing new objects and removing objects. Referring to FIG. 7, a flow chart (700) is provided illustrating a process to control modification of the metaobject file by removing one or more an invalid entry(ies). The storage manager (370) scans the metaobject file (702). As the storage manager finds an invalid entry (e.g. reads a row link count) (704). The invalid entry (e.g. row) is removed from the metaobject file (706). Due to the removal or deletion of the row at step (706) the size of the metaobject file decreases. In one embodiment, a periodic scan of the metaobject file is conducted to retain control over the size of the metaobject file. Similarly, in one embodiment, as an object is removed from data storage, the associated entry in the metaobject file is also removed. Accordingly, management of the metaobject file can take place synchronously with removal of the associated object from data-storage, or deferred for an asynchronous review and/or modification of the metaobject file.

Figure 8:
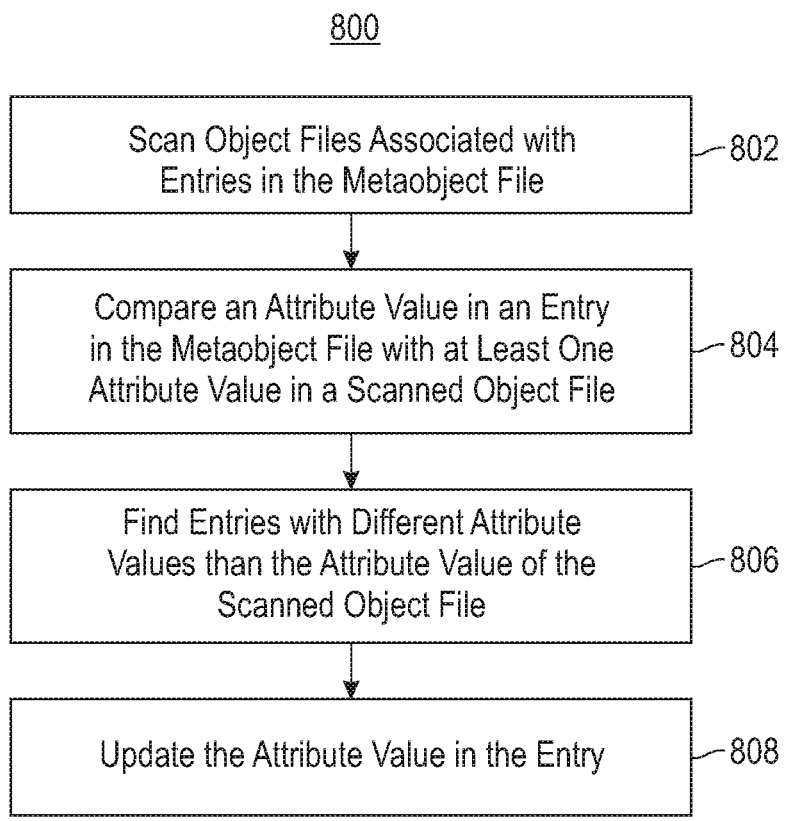
FIG. 8 depicts a flow chart illustrating a process to control modification of the metaobject file by changing an attribute in an existing entry of the metaobject file.

It is understood that a portion of an entry can be modified. Referring to FIG. 8, a flow chart (800) is provided illustrating a process to control modification of the metaobject file by changing an attribute in an existing entry of the metaobject file. The storage manager (370) scans object files associated with entries in the metaobject file (802). During the scan, the storage manager (370) compares an attribute value in an entry in metaobject file with at least one associated attribute value in a scanned object file (804). The storage manager (370) finds entries with an attribute value different than the value of the attribute in the scanned object file (806). The storage manager (370) updates the attribute value in the entry in the metaobject file based on the attribute value in the scanned object file (808). Accordingly, the metaobject file can be updated with changed attribute values in an object file.

Figure 9A:
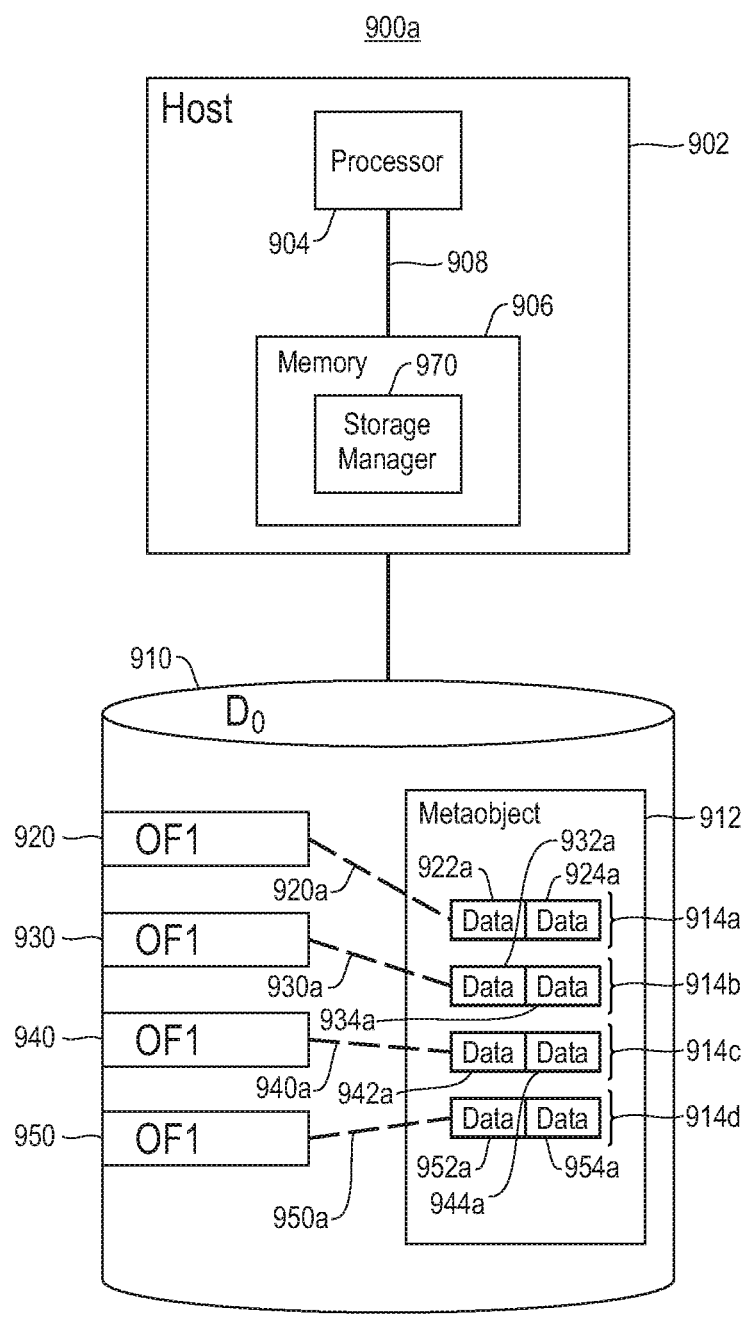
FIGS. 9a-c depict a block diagram illustrating stages of a management and storage of object files associated with modification of the metaobject file.

Referring to FIG. 9a, a data management system (900a) is provided illustrating a modification of the metaobject file (312) as shown in FIG. 3. As shown, the data management system (900a) is depicted following the addition of a $class_1$ object file as shown and described in FIG. 5 to the metaobject file (912). A new $class_1$ object file (950) was added to data storage, $D_0$, (910). When the new $class_1$ object file (950) was added to the data storage, $D_0$, (910) a corresponding new entry (914d) having attributes (952a) and (954a) associated with the $class_1$ object file was added to the metaobject file (912). The relationship between $class_1$ object file (950a) and the attribute entry (914d) is shown by link (950a). Accordingly, as shown, the metaobject file is amended to accommodate a new object in the data storage.

Figure 9B:
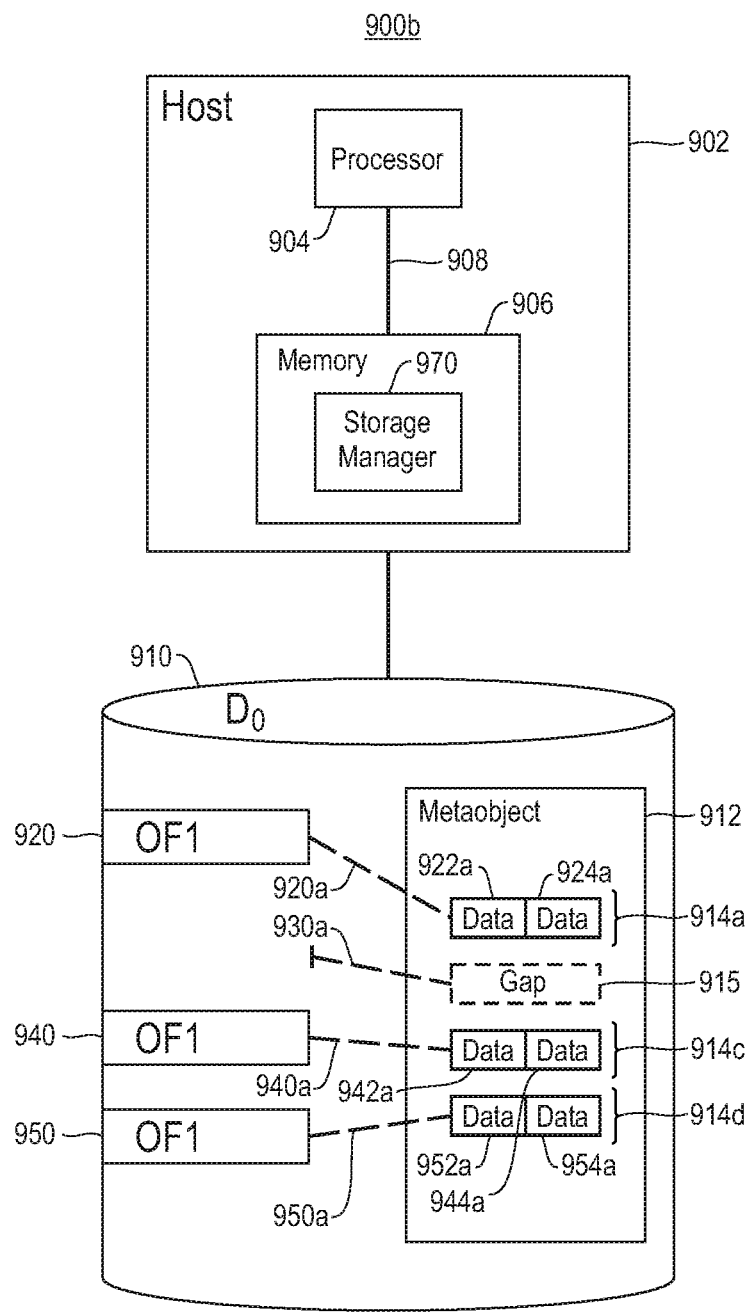

Referring to FIG. 9b, a data management system (900b) is provided illustrating a modification of the metaobject file associated with removal of an object file from the data storage. As shown, the data management system (900b) is depicted following the removal of a $class_1$ object file as shown and described in FIG. 6 from the metaobject file of FIG. 9a. $Class_1$ object file (930) is shown subject to removal from data storage, $D_0$, (910). Either synchronously or asynchronously with removal of the object file (930), the link (930a) to the metaobject file entry (914b) is severed. When the link (930a) is severed, either synchronous or asynchronous with respect to the object removal, the entry (914b) in the metaobject file (912) becomes invalid, and a gap (915) is created in the metaobject file (910). Accordingly, as object entries in the metaobject file are removed, gaps in the metaobject file are created.

Figure 9C:
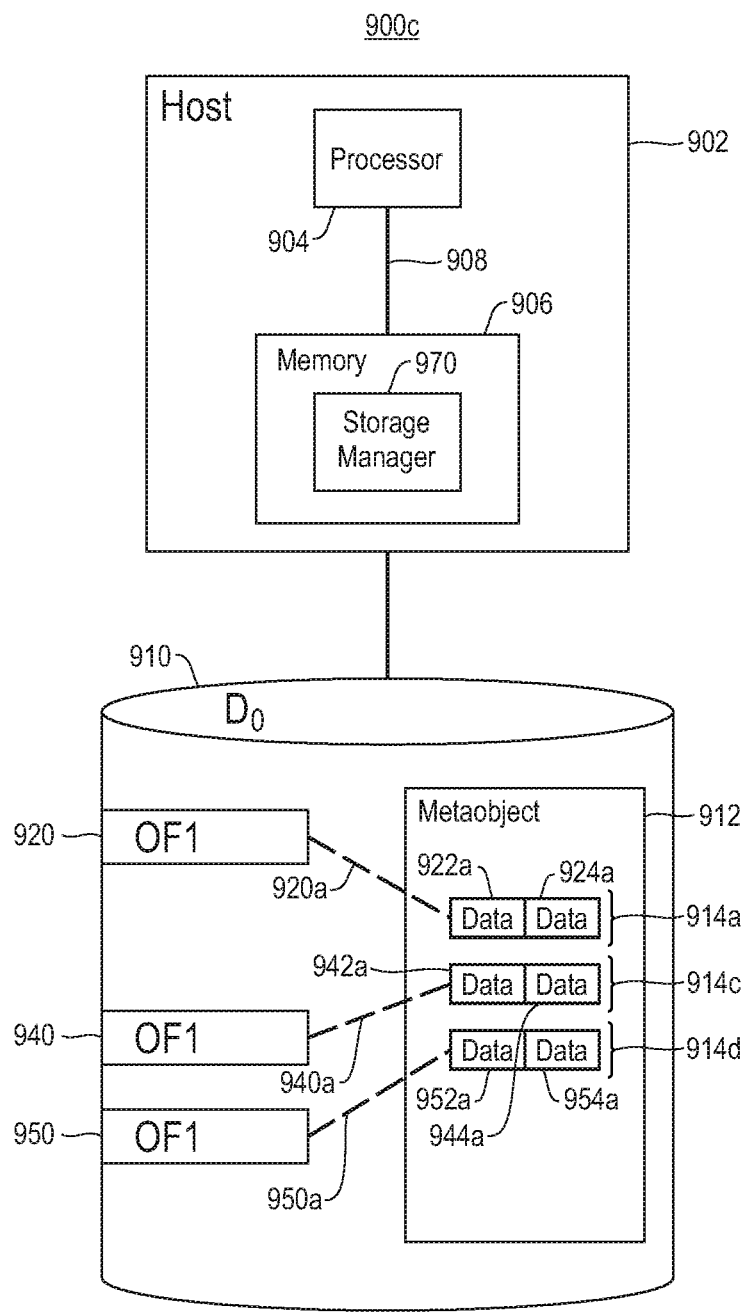

Referring to FIG. 9c, a data management system (900c) is provided illustrating a cleaning stage associated with modification of a metaobject file. As shown, the data management system (900c) is depicted following the removal of openings formed in the metaobject file of FIG. 9b, and as shown and described in FIG. 7. Metaobject file (912) is scanned by the storage manager to determine invalid entries. The entry (914b) is determined to be invalid (e.g. gap (915)) and the gap (915) is shown removed from the metaobject file (910). After removal of the gap the size of the metaobject file decreases. Accordingly, as openings in the metaobject file are created, the storage manager (970) assesses the openings and removes them so that the metaobject file is compacted.

In one embodiment, the metaobject file may contain critical attributes. Critical attributes may be, but are not limited to, data required to locate, translate, understand or assess an object file. To preserve the sensitivity of the object attributes, it is beneficial to have multiple copies of the metaobject file. In one embodiment, at least one copy of the metaobject file is created to limit data loss. Moreover, the metaobject file may be frequently accessed wherein having multiple copies of the metaobject file would increase access efficiency. Therefore, multiple copies of the metaobject file can be created to enable load balancing between the copies of the metaobject files for multiple analytic workloads. The workloads are served by re-directing them to different copies residing in the file distribution system. Additionally, parallel data scans are enabled across the metaobject file copies wherein multiple processes could be launched to scan different portions of the metaobject file. In one embodiment, multiple processes could be launched to scan different metaobject file copies. In one embodiment, the multiple processes are performed on different nodes of a cloud based data system. Accordingly, multiple copies of the metaobject file can increase the efficiency of data scans.

Figure 10:
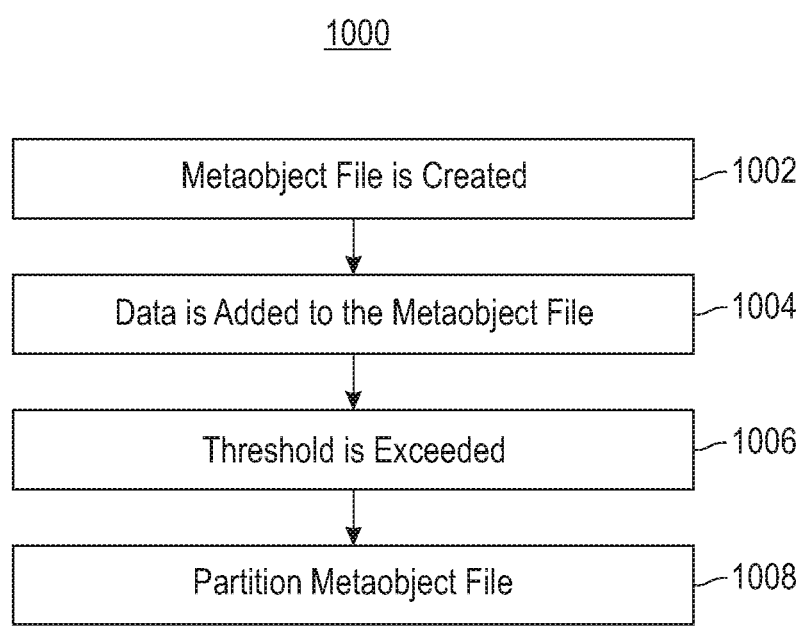
FIG. 10 depicts a flow chart illustrating a process for partitioning the metaobject file for optimized data storage.

Referring to FIG. 10, a flow chart (1000) is provided illustrating a process for partitioning, e.g. subdividing, a metaobject file for optimized data storage. A metaobject file is created as shown and described in FIG. 2 (1002). As data objects are created, entries for the objects are added to the metaobject file (1004). It is understood that the metaobject file may have size constraints to enable efficient use and management of the metaobject file. Following step (1004), it is determined that the size of the metaobject file exceeds a threshold (1006). In one embodiment, the threshold may be preset based on metaobject file management and/or storage constraints. In response to the metaobject file exceeding the threshold, the metaobject file is partitioned into multiple metaobject files (1008). The partitioning of the metaobject file includes partitioning the entries among a plurality of metaobject files. In one embodiment, the partitioning of the metaobject file creates duplicate entries in the partitioned metaobject files. In one embodiment, the partitioning is not proportional wherein the partitions of the original metaobject file contain disparate quantities of entries from the original metafile. In one embodiment, the partitioned metaobject files are stored in different data storage locations. In one embodiment, in response to the metaobject file being below the threshold, the metaobject file may be combined with another metaobject file. As such, the process of partitioning may essentially be reversible by combining one or more partitions. In one embodiment, the process of FIG. 10 is repeated each time the metaobject file exceeds the threshold. Accordingly, the size of the metaobject file can be controlled and relationships between multiple metaobject files are managed.

Figure 11:
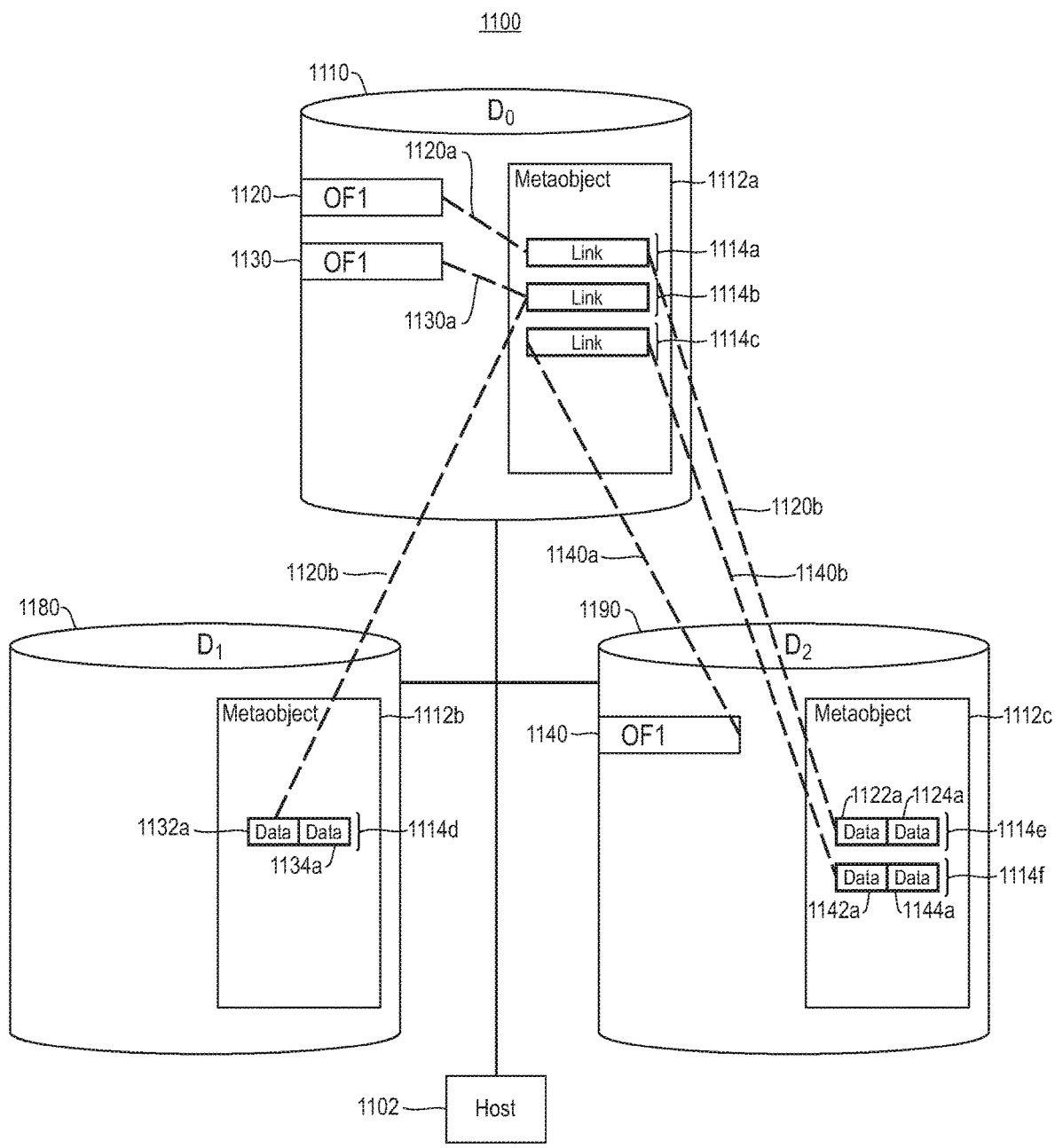
FIG. 11 depicts a block diagram illustrating a partitioned metaobject file.

It is understood that a metaobject file may refer to at least one other metaobject file. The metaobject file of FIG. 3 may be partitioned according to FIG. 10. Referring to FIG. 11, a data management system (1100) is provided illustrating a relationship between a plurality of metaobject file after being partitioned. As shown, data storage (1110), (1180) and (1190) are in communication with each other and a host (1102). Additionally, the data storage (1110) includes a plurality of $class_1$ object files, shown herein as (1120) and (1130) and an original metaobject file (1112a). Data storage (1180) includes a first partition of original metaobject file (1112a), hereinafter referred to as metaobject file (1112b). Data storage (1190) includes $class_1$ object file (1140) and a second partition of original metaobject file (1112a), hereinafter referred to as metaobject file (1112c). In one embodiment, an origin metaobject file is created with links to the partitions of the original metaobject file. Accordingly, a metaobject file may be partitioned and the partitions may be stored in a different location than the local data storage.

Additionally, a metaobject file may contain entries that only contain links to other object files or metaobject files. As shown, metaobject file (1112a) contains entries (1114a), (1114b), and (1114c) which are associated with a corresponding $class_1$ object file. For example, the relationship between the $class_1$ object file (1120) and the entry (1114a) is shown herein with link (1120a). Similarly, the relationship between the class₁ object file (1130) and the entry (1114b) represented by link (1130a), and the relationship between the class₁ object file (1140) and the entry (1114c) is represented by link (1140a). In a similar fashion the entries in metaobject file (1112a) are associated with entries in other metaobject files. For example, the relationship between entry (1114a) in metaobject file (1112a) and the entry (1114e) in metaobject file (1112c) is shown herein with link (1120b). Similarly, the relationship between the entry (1114b) in metaobject file (1112a) and the entry (1114d) in metaobject file (1112b) is represented by link (1130b), and the relationship between the entry (1114c) in metaobject file (1112a) and the entry (1114c) in metaobject file (1112c) represented by link (1140b). Accordingly, an entry in the metaobject file may contain multiple links that refer to another metaobject file or an object file.

The attributes originally contained in metaobject file (1112a) before it was partitioned are moved to metaobject files (1112b) and (1112c). As shown, the metaobject file (1112b) contains entry (1114d) with attributes (1132a) and (1134a). Additionally, the metaobject file (1112c) contains entry (1114e) with attributes (1122a) and (1124a) and entry (1114f) with attributes (1142a) and (1144a). In one embodiment, the original metaobject file is maintained with links to the partitions of the metaobject file based on an attribute wherein the attribute may be, but is not limited to, parameters, class₁ object file ranges, class₂ object file ranges, creation dates, size, database name, database configuration, and index ranges. Accordingly, an original metaobject file that is partitioned into a plurality of metaobject files may be maintained as an index for the partitioned metaobject files.

In one embodiment, data storage may store a metaobject file for one or more data sources. In one embodiment, the metaobject file is located in a data storage location separate from the class₁ object file corresponding to an entry in the metaobject file. In one embodiment, the metaobject file could be a sparse file with fixed space allocated for its metadata. In one embodiment, creating a metaobject file reduces the need to store small files. Accordingly, the quantity of data storage entities in the metaobject file and the location of the data storage should not be considered limiting.

Figure 12:
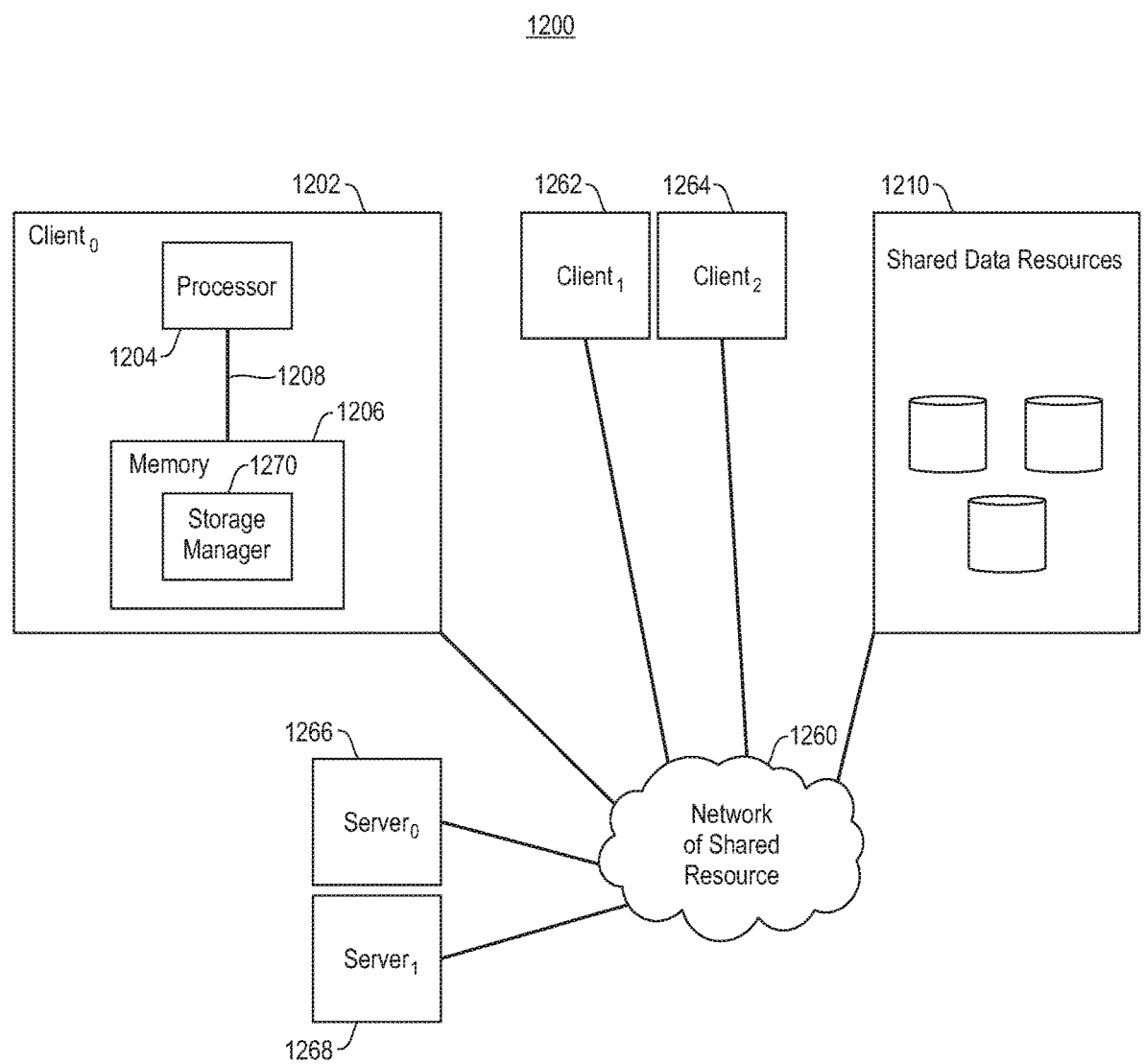
FIG. 12 depicts a schematic of an example system to implement the process shown and described in FIGS. 2, 5, 6-8 and 10.

Aspects of the use of metaobject files to store and analyze data provided in FIGS. 2, 5, 6-8 and 10, employ one or more tools to support use of the metaobject file. Referring to FIG. 12, a block diagram (1200) is provided illustrating a computer system that supports and enables storage and analytics of metadata. A client machine, client₀ (1202) is shown configured with a processing unit (1204) in communication with a memory (1206) across a bus (1208), and in communication with a network of shared resources (1260) across a network connection to provide the client₀ (1202) with access to shared resources, including, but not limited to, shared data resources (1210), other client machines, client₁ (1262) and client₂ (1264), and servers, server₀ (1266) and server₁ (1268). Storage Manager (1270) comprises a plurality of functions, and is stored in memory (1206) for execution by processor (1204). The storage manager (1270) may be located on a different machine from client machine, client₀, (1202). The storage manager (1270) may create, modify or delete metaobject files. Thus, a computer system is provided to enable storage and analytics of metadata.

The shared data resource, such as resource (1210) may be in the form of a storage array. The array is commonly configured with a storage controller to manage two or more storage devices The storage array can be one dimensional with a single category of storage devices, or in one embodiment multi-dimensional, also referred to herein as a tiered storage solution with multiple types of storage, e.g. persistent RAM, SSD, HDD, and Tape. More specifically, tiered storage directs data to a storage media within the storage array based on performance, availability, and recovery requirements.

Aspects of the functional tool, e.g. storage manager (1270), and its associated functionality may be embodied in a computer system/server in a single location, or in one embodiment, may be configured in a cloud based system sharing computing resources. With references to FIG. 13, a block diagram (1300) is provided illustrating an example of a computer system/server (1302), hereinafter referred to as a host (1302) in communication with a cloud based support system, to implement the processes described above with respect to FIGS. 2, 5, 6-8 and 10. Host (1302) is operational with numerous other general purpose or special purpose computing system environments or configurations. Examples of well-known computing systems, environments, and/or configurations that may be suitable for use with host (1302) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1302) may be described in the general context of computer system-executable instructions, such as program modules, being executed by a computer system. Generally, program modules may include routines, programs, objects, components, logic, data structures, and so on that perform particular tasks or implement particular abstract data types. Host (1302) may be practiced in distributed cloud computing environments where tasks are performed by remote processing devices that are linked through a communications network. In a distributed cloud computing environment, program modules may be located in both local and remote computer system storage media including memory storage devices.

Figure 13:
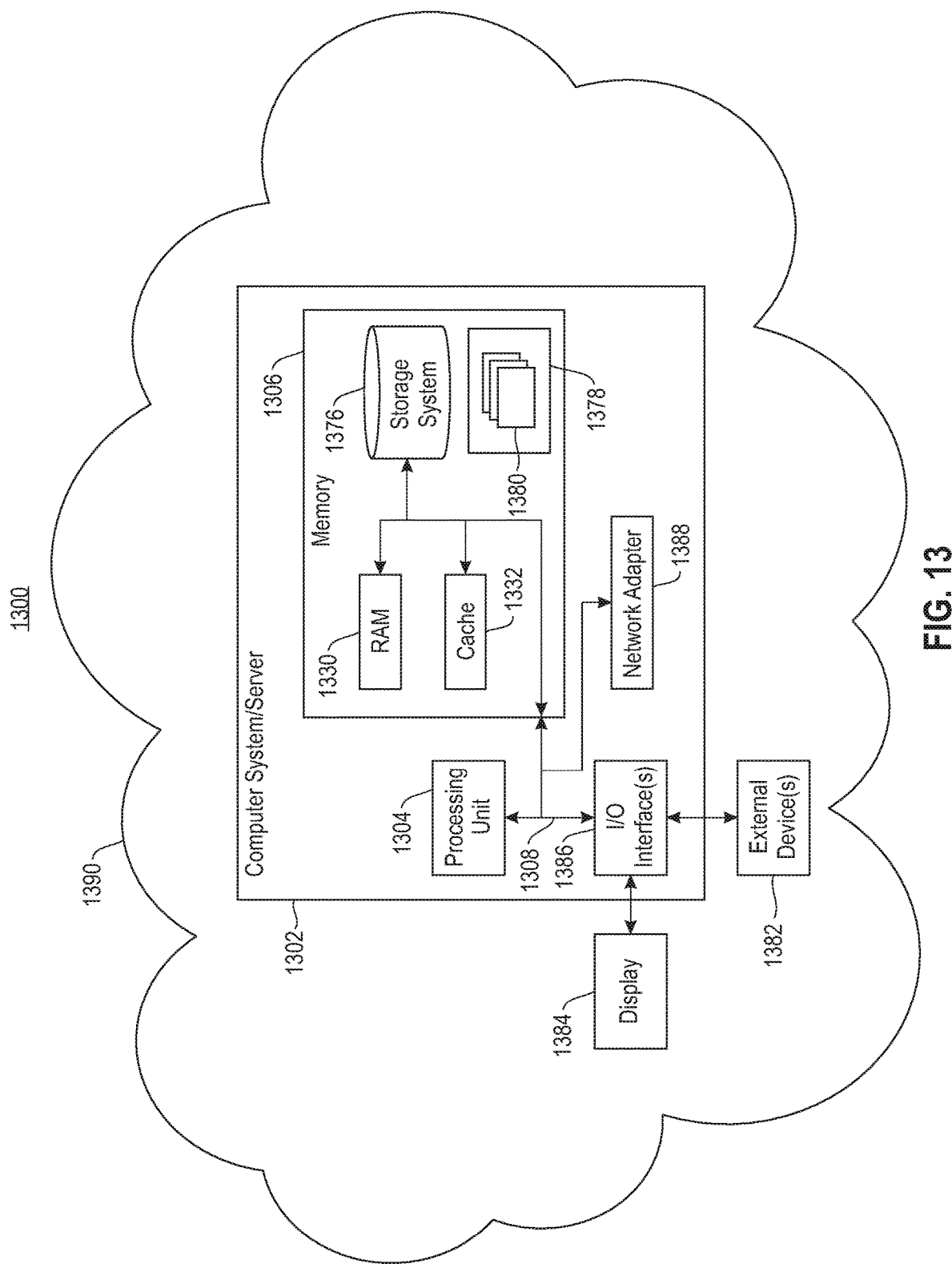
FIG. 13 is a block diagram illustrating an example of a computer system/server of a cloud based support system, to implement the process described above with respect to FIGS. 1-11.

As shown in FIG. 13, host (1302) is shown in the form of a general-purpose computing device. The components of host (1302) may include, but are not limited to, one or more processors or processing units (1304), a system memory (1306), and a bus (1308) that couples various system components including system memory (1306) to processor (1304). Bus (1308) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1302) typically includes a variety of computer system readable media. Such media may be any available media that is accessible by host (1302) and it includes both volatile and non-volatile media, removable and non-removable media.

Memory (1306) can include computer system readable media in the form of volatile memory, such as random access memory (RAM) (1372) and/or cache memory (1374). By way of example only, storage system (1376) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1308) by one or more data media interfaces.

Program/utility (1378), having a set (at least one) of program modules (1380), may be stored in memory (1306) by way of example, and not limitation, as well as an operating system, one or more application programs, other program modules, and program data. Each of the operating systems, one or more application programs, other program modules, and program data or some combination thereof, may include an implementation of a networking environment. Program modules (1380) generally carry out the functions and/or methodologies of embodiments to store and analyze data. For example, the set of program modules (1380) may include the modules configured to allow the use of metaobject files as described in FIGS. 2, 5, 6-8 and 10.

Host (1302) may also communicate with one or more external devices (1382), such as a keyboard, a pointing device, etc.; a display (1384); one or more devices that enable a user to interact with host (1302); and/or any devices (e.g., network card, modem, etc.) that enable host (1302) to communicate with one or more other computing devices. Such communication can occur via Input/Output (I/O) interface(s) (1386). Still yet, host (1302) can communicate with one or more networks such as a local area network (LAN), a general wide area network (WAN), and/or a public network (e.g., the Internet) via network adapter (1388). As depicted, network adapter (1388) communicates with the other components of host (1302) via bus (1308). In one embodiment, a plurality of nodes of a distributed file system (not shown) is in communication with the host (1302) via the I/O interface (1386) or via the network adapter (1388). It should be understood that although not shown, other hardware and/or software components could be used in conjunction with host (1302). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1306), including RAM (1372), cache (1374), and storage system (1376), such as a removable storage drive and a hard disk installed in a hard disk drive.

Computer programs (also called computer control logic) are stored in memory (1306). Computer programs may also be received via a communication interface, such as network adapter (1388). Such computer programs, when run, enable the computer system to perform the features of the present embodiments as discussed herein. In particular, the computer programs, when run, enable the processing unit (1304) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (1302) is a node (1390) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 14:
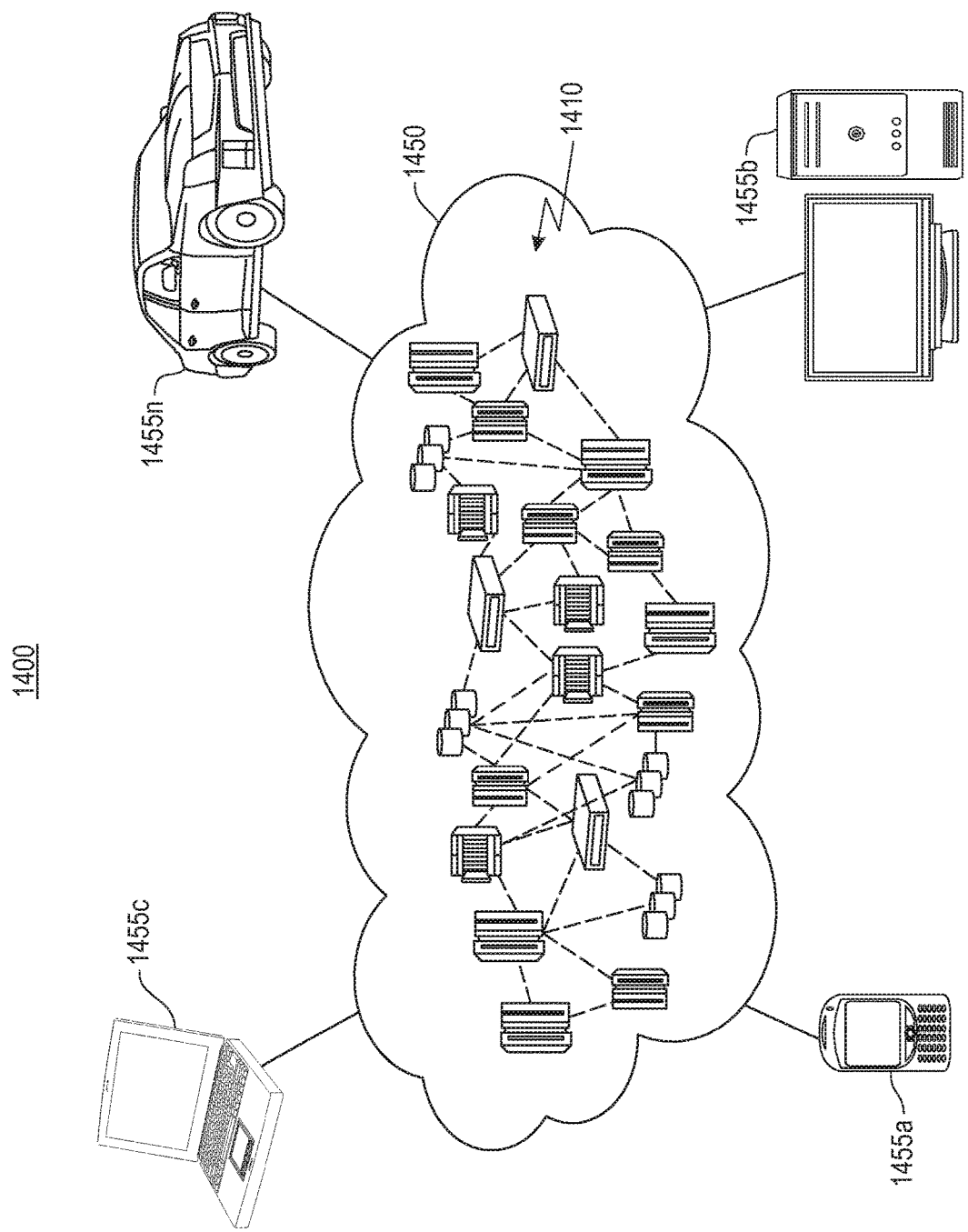
FIG. 14 depicts a block diagram illustrating a cloud computer environment.

Referring now to FIG. 14, an illustrative cloud computing network (1400). As shown, cloud computing network (1400) includes a cloud computing environment (1450) having one or more cloud computing nodes (1410) with which local computing devices used by cloud consumers may communicate. Examples of these local computing devices include, but are not limited to, personal digital assistant (PDA) or cellular telephone (1455A), desktop computer (1455B), laptop computer (1455C), and/or automobile computer system (1455N). Individual nodes within nodes (1410) may further communicate with one another. They may be grouped (not shown) physically or virtually, in one or more networks, such as Private, Community, Public, or Hybrid clouds as described hereinabove, or a combination thereof. This allows cloud computing environment (1400) to offer infrastructure, platforms and/or software as services for which a cloud consumer does not need to maintain resources on a local computing device. It is understood that the types of computing devices (1455A-N) shown in FIG. 14 are intended to be illustrative only and that the cloud computing environment (1450) can communicate with any type of computerized device over any type of network and/or network addressable connection (e.g., using a web browser).

Figure 15:
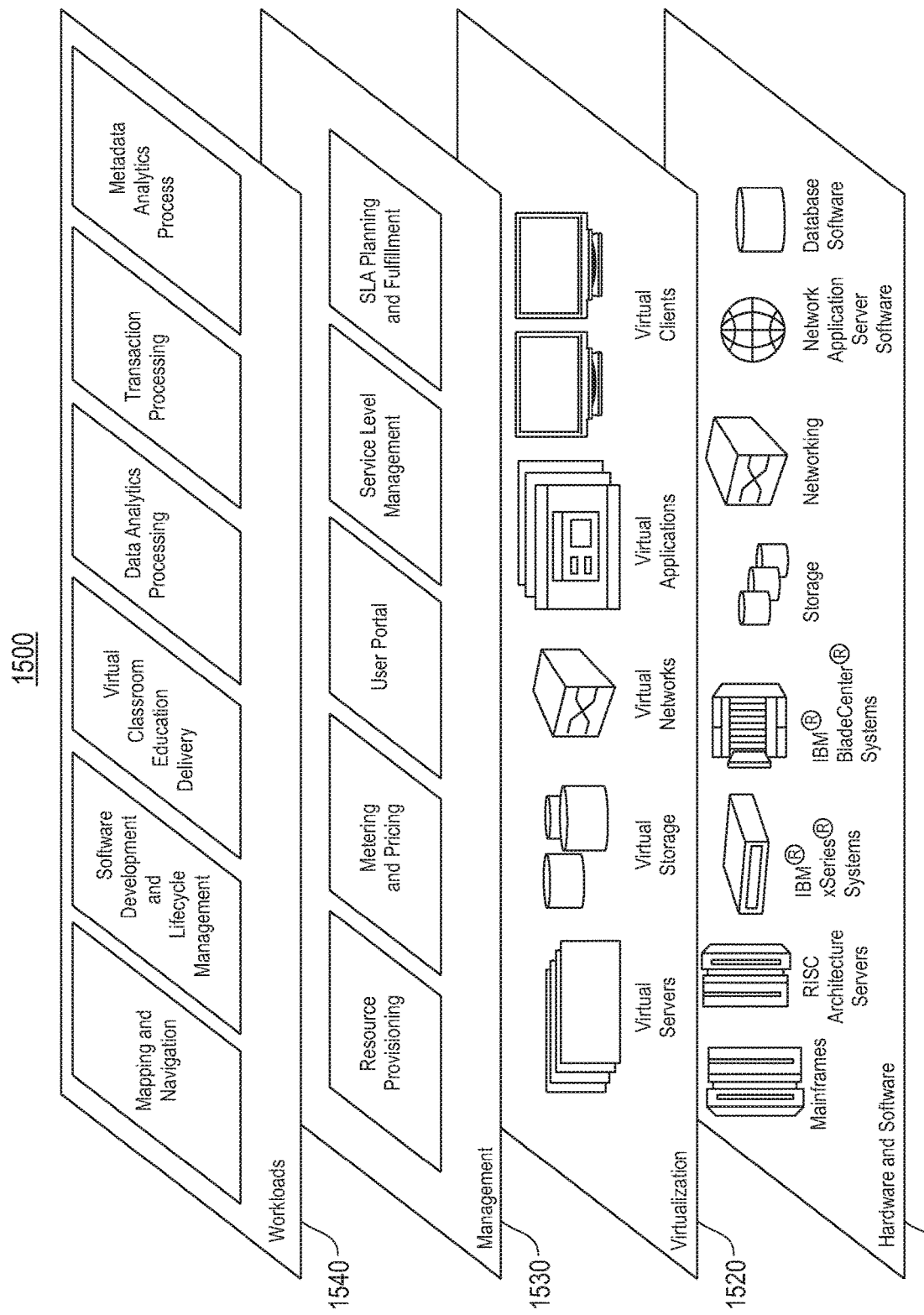
FIG. 15 depicts a block diagram illustrating a set of functional abstraction model layers provided by the cloud computing environment.

Referring now to FIG. 15, a set of functional abstraction layers provided by the cloud computing network of FIG. 13 is shown. It should be understood in advance that the components, layers, and functions shown in FIG. 15 are intended to be illustrative only, and the embodiments are not limited thereto. As depicted, the following layers and corresponding functions are provided: hardware and software layer (1510), virtualization layer (1520), management layer (1530), and workload layer (1540). The hardware and software layer (1510) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1520) provides an abstraction layer from which the following examples of virtual entities may be provided: virtual servers; virtual storage; virtual networks, including virtual private networks; virtual applications and operating systems; and virtual clients.

In one example, management layer (1530) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1540) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and metadata analytics processing.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer programs products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed.

Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of managing data at scale and performing analytics on the data.

It will be appreciated that, although specific embodiments have been described herein for purposes of illustration, various modifications may be made without departing from the spirit and scope of the embodiments. In particular, the type of file associated with the metaobject file should not be considered limiting. In one embodiment, the storage manager can be located on a different computer system than the database system it manages. Accordingly, the scope of protection of these embodiments is limited only by the following claims and their equivalents.

What is claimed is:

1. A computer system comprising:
a processing unit operatively coupled to memory;
a tool in communication with the processing unit to enable storage of object files, including:
store two or more objects as files in data storage, including classify the objects based on object characteristics, including a first classification and a second classification;
create a metaobject file in the data storage, including:
for each object in the first classification, extract attributes from a first object classification file, including an object identifier, create an entry in the metaobject file, store the extracted attributes in the created entry in the metaobject file, and remove the first object classification file from the data storage; and for each object in the second classification, retain the object as a second object classification file in the data storage, extract an attribute from the second object classification file and associate the extracted attribute with the created entry in the metaobject file, and create a link between the second object classification file and the related entry in the metaobject file; and receive a read request for at least one file in the second classification, including translate the received request to a read of the metaobject file.

2. The computer system of claim 1, further comprising the tool to:

update the metaobject with a new entry, including adding a new object file in the second classification in the data storage, extract an attribute from the new object and enter the extracted attribute in the new entry, and create a new link between the new object file and the new entry.

3. The computer system of claim 1, further comprising the tool to:

update the metaobject with removal of an entry, including identify an object from the second classification subject to deletion, sever the link between the identified object and the associated entry in the metaobject, and remove the associated entry from the metaobject.

4. The computer system of claim 1, further comprising the tool to:

evaluate a size of the metaobject and partition the metaobject, the partitioning further comprising the tool to:

separate the metaobject into first and second metaobjects; and create an origin metaobject with an index having a first entry with a link to the first metaobject and a second entry with a link to the second metaobject.

5. The computer system of claim 1, further comprising the tool to:

organize a plurality of entries in the metaobject in a format selected from the group consisting of: row orientation and column orientation.

6. The computer system of claim 5, wherein the plurality of entries are organized in a column orientation format and the read of the metaobject file is a sequential read of the metaobject file.

7. The computer system of claim 1, further comprising the tool to:

create an index within the metaobject file, the index providing an offset to metadata for each indexed file.

8. A computer program product for enabling storage and analytics of metadata, the computer program product comprising a computer readable storage device having program code embodied therewith, the program code executable by a processing unit to:

store two or more objects as files in data storage, including classify the objects based on object characteristics, including a first classification and a second classification;

create a metaobject file in the data storage, including program code to:

for each object in the first classification, extract attributes from a first object classification file, including an object identifier, create an entry in the metaobject file, store the extracted attributes in the created entry in the metaobject file, and remove the first object classification file from the data storage; and for each object in the second classification, retain the object as a second object classification file in the data storage, extract an attribute from the second object classification file and associate the extracted attribute with the created entry in the metaobject file, and create a link between the second object classification file and the related entry in the metaobject file; and receive a read request for at least one file in the second classification, including translate the received request to a read of the metaobject file.

9. The computer program product of claim 8, further comprising program code to:

update the metaobject with a new entry, including adding a new object file in the second classification in the data storage, extract an attribute from the new object and enter the extracted attribute in the new entry, and create a new link between the new object file and the new entry.

10. The computer program product of claim 8, further comprising program code to:

update the metaobject with removal of an entry, including identify an object from the second classification subject to deletion, sever the link between the identified object and the associated entry in the metaobject, and remove the associated entry from the metaobject.

11. The computer program product of claim 8, further comprising program code to:

evaluate a size of the metaobject and partition the metaobject, the partitioning further comprising program code to:

separate the metaobject into first and second metaobjects; and create an origin metaobject with an index having a first entry with a link to the first metaobject and a second entry with a link to the second metaobject.

12. The computer program product of claim 8, further comprising program code to:

organize a plurality of entries in the metaobject in a format selected from the group consisting of: row orientation and column orientation.

13. The computer program product of claim 8, further comprising program code to:

create an index within the metaobject file, the index providing an offset to metadata for each indexed file.

14. A method comprising:

storing two or more objects as files in data storage, including classifying the objects based on object characteristics, including a first classification and a second classification;

creating a metaobject file in the data storage, including:

for each object in the first classification, extracting attributes from a first object classification file, including an object identifier, creating an entry in the metaobject file, storing the extracted attributes in the created entry in the metaobject file, and removing the first object classification file from the data storage; and for each object in the second classification, retaining the object as a second object classification file in the data storage, extracting an attribute from the second object classification file and associating the extracted attribute with the created entry in the metaobject file, and creating a link between the second object classification file and the related entry in the metaobject file; and receiving a read request for at least one file in the second classification, including translating the received request to a read of the metaobject file.

15. The method of claim 14, further comprising updating the metaobject with a new entry, including adding a new object file in the second classification in the data storage, extracting an attribute from the new object and entering the extracted attribute in the new entry, and creating a new link between the new object file and the new entry.

16. The method of claim 14, further comprising updating the metaobject with removal of an entry, including identifying an object from the second classification subject to deletion, severing the link between the identified object and the associated entry in the metaobject, and removing the associated entry from the metaobject.

17. The method of claim 14, further comprising evaluating a size of the metaobject and partitioning the metaobject, the partitioning further comprising:

separating the metaobject into first and second metaobjects; and creating an origin metaobject with an index having a first entry with a link to the first metaobject and a second entry with a link to the second metaobject.

18. The method of claim 14, further comprising organizing a plurality of entries in the metaobject in a format selected from the group consisting of: row orientation and column orientation.

19. The method of claim 18, wherein the plurality of entries are organized in a column orientation format and the read of the metaobject file is a sequential read of the metaobject file.

20. The method of claim 14, further comprising creating an indexing within the metaobject file, the index providing an offset to metadata for each indexed file.

* * * * *